(12) United States Patent
Wuidart

(10) Patent No.: US 8,552,741 B2
(45) Date of Patent: Oct. 8, 2013

(54) DETECTION OF A DISTANCE VARIATION WITH RESPECT TO A ROTATION AXIS

(75) Inventor: Luc Wuidart, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 411 days.

(21) Appl. No.: 12/989,885

(22) PCT Filed: Apr. 28, 2009

(86) PCT No.: PCT/FR2009/050783
§ 371 (c)(1),
(2), (4) Date: Nov. 29, 2010

(87) PCT Pub. No.: WO2009/138687
PCT Pub. Date: Nov. 19, 2009

(65) Prior Publication Data
US 2011/0095769 A1    Apr. 28, 2011

(30) Foreign Application Priority Data
Apr. 30, 2008   (FR) ...................................... 08 52919

(51) Int. Cl.
*G01R 27/32* (2006.01)
*G01R 31/08* (2006.01)

(52) U.S. Cl.
USPC ........................................ 324/635; 327/522

(58) Field of Classification Search
USPC .................................. 324/635, 522
See application file for complete search history.

(56) References Cited

U.S. PATENT DOCUMENTS

| 5,003,704 A | 4/1991 | Schubert |
|---|---|---|
| 6,473,028 B1 | 10/2002 | Luc |
| 6,650,226 B1 | 11/2003 | Wuidart et al. |
| 6,703,921 B1 * | 3/2004 | Wuidart et al. ............. 340/10.4 |
| 2009/0224899 A1 | 9/2009 | Wieser |

FOREIGN PATENT DOCUMENTS

| EP | 0857981 A1 | 8/1998 |
|---|---|---|
| WO | WO 9400306 A | 1/1994 |
| WO | WO 0112453 A | 2/2001 |

OTHER PUBLICATIONS

International Search Report dated Dec. 15, 2009 from corresponding International Application PCT/FR2009/050783.
English language translation of the International Search Report dated Dec. 6, 2010 from corresponding International Application PCT/FR2009/050783.

* cited by examiner

*Primary Examiner* — Amy He
(74) *Attorney, Agent, or Firm* — Wolf, Greenfield & Sacks, P.C.

(57) ABSTRACT

A method of detection of a distance variation with respect to an axis of at least one point of an object rotating around this axis by a terminal at a fixed position with respect to the axis and capable of emitting a radiofrequency field for at least one resonant circuit attached to the object. The method includes the steps of measuring and recording, on the terminal side, a maximum value of a quantity representative of the coupling between an oscillating circuit of the terminal and the at least one resonant circuit; and detecting a variation of this periodic maximum.

31 Claims, 6 Drawing Sheets

DETECTION OF A DISTANCE VARIATION WITH RESPECT TO A ROTATION AXIS

CROSS REFERENCE TO RELATED APPLICATIONS

This application is a U.S. National Stage patent application based on PCT Application Number PCT/FR2009/050783, filed on Apr. 28, 2009, entitled "Detection Of A Distance Variation With Respect To A Rotation Axis", which application claims the priority benefit of French patent application Ser. No. 08/52919, filed on Apr. 30, 2008, entitled "Detection Of A Distance Variation With Respect To A Rotation Axis," which is hereby incorporated by reference to the maximum extent allowable by law.

BACKGROUND OF THE INVENTION

1. Field of the Invention

The present invention generally relates to systems using transponders, that is, transceivers (generally mobile) capable of communicating in a contactless and wireless fashion with a terminal.

The present invention more specifically relates to systems using transponders for the detection of a distance variation with respect to an axis of a point of an object rotating around this axis (the length variation of a radius in the case of a circular object). The present invention will be more specifically described in the context of the detection of a pressure fault in a tire.

2. Discussion of the Related Art

More and more tires are equipped with pressure sensors to detect a mis-inflation and notify the driver, a maintenance service, etc.

The emergence of transponder systems has enabled avoiding wire connections between the rim of the tire and the vehicle. The pressure sensor is then associated with a transponder capable of transmitting the information to a terminal supported by the vehicle (for example, the axle, the inside of the fender, etc.). The transponder generally is an active transponder, that is, associated with a battery (often rechargeable) providing the power required for its operation thereto. The sensor-transponder element may be supported by the rim or by the actual tire.

Other sensor types may be associated with a transponder in a tire. For example, these may be wear sensors.

The element associated with the tire comprises a sensor of the specific detected quantity (pressure, thickness of the tire, temperature), a circuit of conversion into electric signals, and a transponder for transmitting the information to the terminal. Further, to detect several quantities of different nature (for example, the pressure and the wearing), two sensors, or even two complete elements are necessary.

Due to the significant generated cost, pressure sensors are most often supported by the rims which have a longer durability. For automobile vehicles, this results in that, in case of a temporary rim change (for example, for the spare wheel or for snow tires assembled on other rims), the pressure detection function can no longer be ensured.

SUMMARY OF THE INVENTION

It would be desirable to have an element for detecting a tire pressure defect which is simpler or less expensive than an association of a pressure sensor with an active transponder.

It would also be desirable to have a general element for detecting a potential problem of a tire.

It would also be desirable to have a solution independent from the tire rim.

It would also be desirable to use other functions of the transponder, for example, for the tire identification.

More generally, it would also be desirable to have an element for detecting a distance variation with respect to an axis of a point of an object rotating around this axis.

To achieve all or part of these objects as well as others, at least one embodiment of the present invention provides a method of detection of a distance variation with respect to an axis of at least one point of an object rotating around this axis by a terminal at a fixed position with respect to the axis and capable of emitting a radiofrequency field for at least one resonant circuit attached to the object, comprising the steps of measuring and recording, on the terminal side, a maximum value of a quantity representative of the coupling between an oscillating circuit of the terminal and said at least one resonant circuit; and detecting a variation of this periodic maximum.

According to an embodiment of the present invention, the resonant circuit is an element of a transponder capable of transmitting a signature to the terminal.

According to an embodiment of the present invention, a reference value of said quantity is measured and recorded, on the terminal side, in an initial condition of the object.

According to an embodiment of the present invention, an off-load value of said quantity is measured and recorded, on the terminal side, in the absence of the object, said detection being performed based on the variation of the quotient of this off-load value to the measured value with respect to the quotient of this off-load value to the reference value.

According to an embodiment of the present invention, a series resistance of the oscillating circuit of the terminal is adjusted so that the reference value corresponds to an optimum coupling position between the terminal and the resonant circuit.

According to an embodiment of the present invention, the value of the series resistance is selected so that the ratio between the off-load value and the reference value is approximately equal to 2.

According to an embodiment of the present invention, said quantity is data relative to the current in the oscillating circuit or to the voltage thereacross.

According to an embodiment of the present invention, the object is a tire of a wheel assembled on an axle and the resonant circuit is attached to the tire in a fixed position with respect to its tread.

At least one embodiment of the present invention also provides a system of detection of the distance with respect to an axis of at least one point of an object rotating around this axis, by a terminal at a fixed position with respect to the axis and capable of emitting a radiofrequency field towards a resonant circuit attached to the object, adapted to the implementation of the above method.

According to an embodiment of the present invention, the system further comprises means for detecting the stopping or the starting of the rotating object, and/or means for detecting the stopping position of the rotating object, and/or means for measuring the speed of the rotating object.

The foregoing objects, features, and advantages of the present invention will be discussed in detail in the following non-limiting description of specific embodiments in connection with the accompanying drawings.

DETAILED DESCRIPTION

Figure 1:
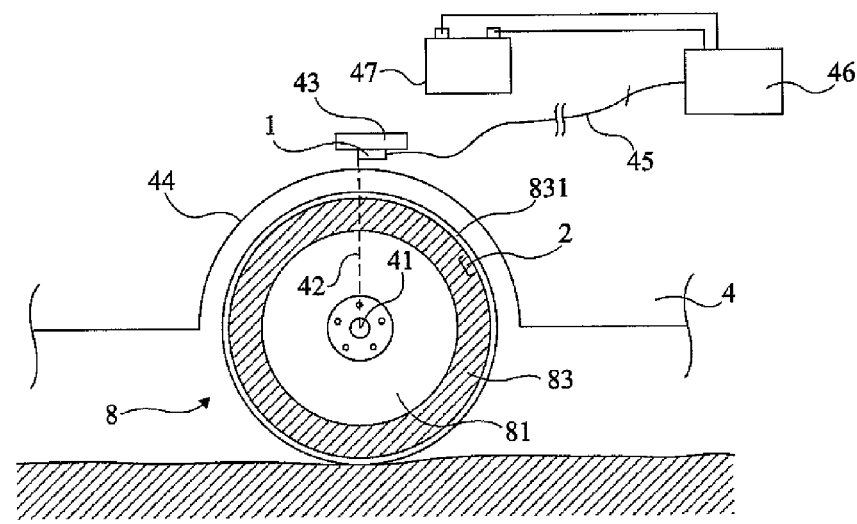
FIG. 1 is a lateral view of a wheel of a vehicle illustrating an embodiment of a system for detecting a defect of a tire.

The same elements have been designated with the same reference numerals in the different drawings. For clarity, only those steps and elements which are useful to the understanding of the present invention have been shown and will be described. In particular, the possible data exchanges in communications between a transponder and a terminal have not been detailed, the present invention being compatible with any usual communication.

FIG. 1 is a very simplified lateral view of a wheel 8 of a vehicle 4 illustrating an embodiment of a system for detecting a defect of a tire.

Figure 2:
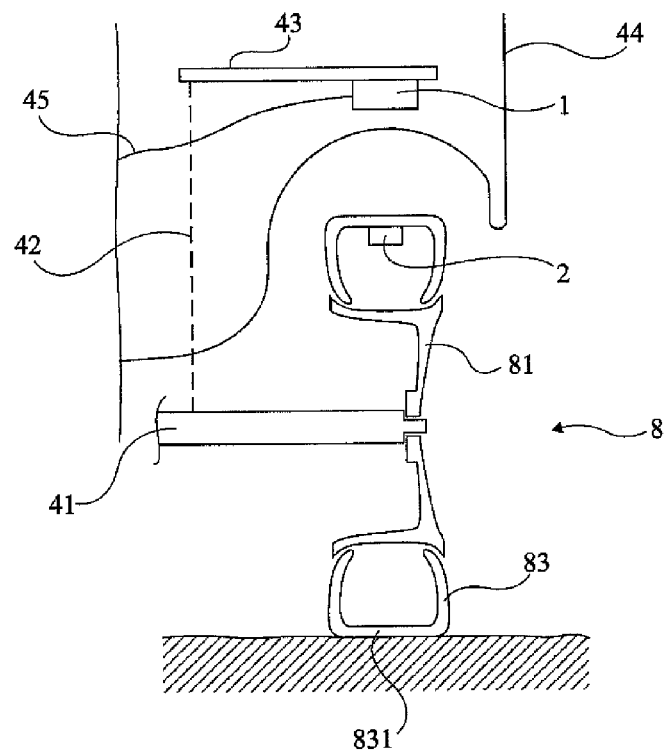
FIG. 2 is an axial cross-section view of the wheel of FIG. 1.

FIG. 2 is a vertical cross-section view at the level of the axis of the wheel of FIG. 1.

Wheel 8 comprises a rim 81 assembled on an axle 41 of vehicle 4 and a tire 83 assembled on the rim. An electronic element 2 comprising at least one resonant circuit is associated with tread 831 of tire 83. In a more advanced embodiment, element 2 is an electronic tag (TAG) or an electromagnetic transponder.

A terminal 1 of radiofrequency transmission and, for more advanced embodiments, of communication with a transponder, equips the vehicle. Terminal 1 is supported by an armature of the vehicle which faces tread 831 of the tire, for example, by an armature 43 linked to axle 41 and masked inside of fender 44 of the body, as shown. This feature is illustrated in FIGS. 1 and 2 by a dotted line 42 connecting axle 41 to an arm or support 43 of terminal 1. As a variation, for a vehicle of plane type, the terminal may be supported by the end of the landing gear linkage. Terminal 1 is connected, for example by a wire connection 45 or by a radiofrequency connection, to a data processing system, for example, an embedded computer 46 of the vehicle. Terminal is powered, possibly via embedded computer 46, by battery 47 of the vehicle. Preferably, all the vehicle wheels are equipped with an element 2 and are associated with a terminal 1.

Element 2 is for example attached to the internal surface of tread 831, as shown, or embedded in the tread. Using an element placed on the internal surface of the tread enables not needing to modify the manufacturing of tire 83 or to equip existing tires. As a variation, element 2 is placed, inside of the tire, for example on rim 81, in a position such that it passes, for each turn of the tire, in front of terminal 1 (or at least within the range thereof).

The relative positioning of terminal 1 and of element 2 is such that a variation of the tire thickness (by wearing, over-inflation or deflation) translates as a modification of the distance which separates element 2 from terminal 1. This distance modification, with respect to a reference distance corresponding to a properly inflated non-worn tire, is then detected by the terminal which can trigger an alert or any appropriate action.

Reference will more specifically be made hereafter to a transponder but, except for communications with the terminal, the operation is the same with an element 2 formed of a simple resonant circuit.

Figure 3:
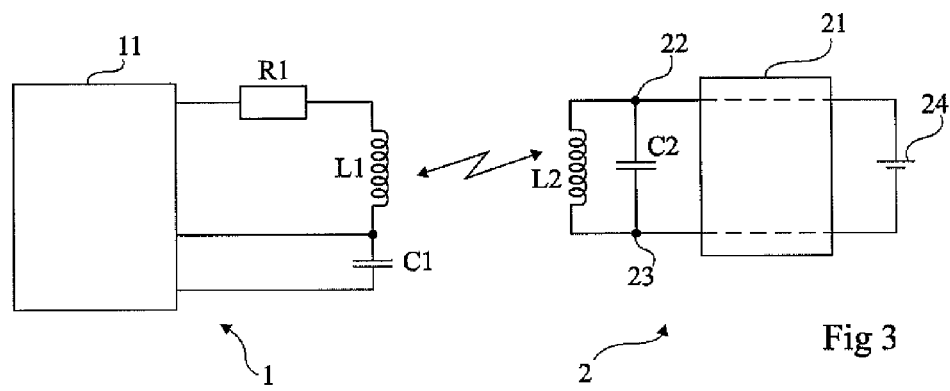
FIG. 3 very schematically shows an example of a terminal-transponder pair usable in the system of FIG. 1.

FIG. 3 very schematically shows an embodiment of the terminal-transponder system of FIGS. 1 and 2.

Terminal 1 comprises a series oscillating circuit formed of an inductance L1 in series with a capacitor C1 and a resistor R1. This series oscillating circuit is controlled by a device 11 comprising, among others and non-limitingly, an amplifier or antenna coupler and a transmission control and exploitation circuit especially provided with a modulator/demodulator and with a control and data processing circuit (generally a microprocessor). Device 11 generally communicates with different input/output circuits (elements of exchange with embedded computer 46 of the vehicle) and/or processing circuits, not shown.

Element 2 capable of cooperating with terminal 1 comprises an oscillating circuit, for example, parallel, formed of an inductance L2 in parallel with a capacitor C2 between two terminals 22 and 23. In a simplified embodiment, the element is limited to these two elements, which may be associated with a resistor (not shown). In the shown embodiment, this element is a transponder capable of responding to a query from the terminal, for example, by communicating an identifier or other data. Terminals 22 and 23 then are the input terminals of a control and processing circuit 21. Transponder 2 may also comprise a battery 24 capable of powering its different elements.

Terminals 22 and 23 are, in practice, connected to the input of a rectifying element (not shown in FIG. 3) having its outputs forming supply terminals of the circuits internal to the transponder. These circuits generally comprise a memory and a modulator for transmitting data to the terminal. According to the transponder type (according to the application and to the tasks that it is supposed to perform), these circuits may also comprise a demodulator of the signals that may be received from the terminal, a microprocessor, and various other processing circuits.

The oscillating circuits of the terminal and of the transponder are generally tuned to a same frequency corresponding to the frequency of an excitation signal of the oscillating circuit of the terminal. This high-frequency signal (for example, at 13.56 MHz) is used not only as a carrier for transmitting data from the terminal to the transponder, but also as a remote-supply carrier for the transponders located in the field of the terminal. When a transponder 2 is in the field of a terminal 1, a high-frequency voltage is generated between terminals 21 and 23 of the resonant circuit of the transponder. This voltage is used to provide the supply voltage of electronic circuits 21 of the transponder. This voltage may also be used to charge a battery or another power storage element 24 of the transponder, which powers the circuits when the transponder is not within the range of a terminal.

It has already been provided to interpret measurements of quantities linked to the coupling between a transponder and a terminal to estimate the distance which separates the transponder from the terminal. An example of a technique of distance estimation by a transponder is described in U.S. Pat. No. 6,473,028. An example of a technique of distance estimation by a terminal is described in U.S. Pat. No. 6,650,226. Such distance estimations are generally used to optimize the power transfer or the communication between the two elements.

Figure 4:
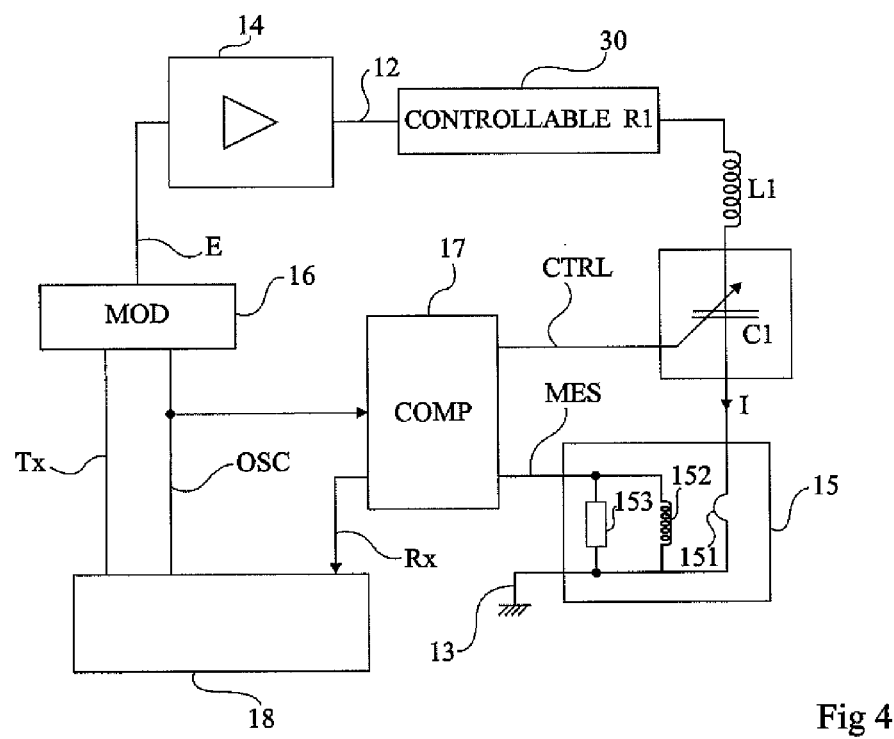
FIG. 4 is a simplified block diagram of the terminal of FIG. 3.

FIG. 4 is a block diagram of an embodiment of a terminal 1. As indicated previously, terminal 1 comprises an oscillating circuit formed of an inductance or antenna L1 in series with a capacitive element C1 and a resistive element R1. In the example of FIG. 4, these elements are connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal E originating from a modulator 16 (MOD) which receives a reference frequency (signal OSC), for example, from a quartz oscillator (not shown). Modulator 16 receives, if need be, a signal Tx of data to be transmitted and, in the absence of a data transmission between the terminal, provides the high-frequency carrier (for example, at 13.56 MHz) capable of driving the resonant circuit of the transponder. Capacitive element C1 is a variable-capacitance element controllable by a signal CTRL. A phase regulation of the current in antenna L1 is performed with respect to a reference signal. This regulation is a regulation of the high-frequency signal, that is, of the signal of the carrier corresponding to signal E in the absence of data to be transmitted. The regulation is performed by varying capacitance C1 of the oscillating circuit of the terminal to maintain the current in the antenna in constant phase relation with the reference signal. This reference signal corresponds, for example, to signal OSC provided by the oscillator to the modulator. Signal CTRL originates from a circuit 17 (COMP) having the function of detecting the phase difference with respect to the reference signal and of accordingly modifying the capacitance of element C1. The phase measurement is performed, for example, from a measurement of current I in the oscillating circuit due to measurement element 15. In the shown example, a current transformer comprises a primary winding 151 between element C1 and ground terminal 13, and a secondary winding 152 having a first terminal directly connected to ground and having its other terminal providing a signal MES indicative of the result of the measurement. A current-to-voltage conversion resistor 153 is connected in parallel with secondary winding 152. The result of measurement MES is sent to comparator 17, which accordingly controls capacitive element C1 by means of signal CTRL.

In the embodiment illustrated in FIG. 4, comparator 17 uses the same phase demodulator (not shown) as that used to demodulate the signal originating from the transponder and possibly received by the oscillating circuit. Accordingly, comparator 17 provides a signal Rx giving back a possible retromodulation of data received from a transponder to a block 18 symbolizing the rest of the electronic circuits of the terminal.

The response time of the phase regulation loop is selected to be sufficiently long to avoid disturbing the possible retromodulation originating from a transponder, and sufficiently short as compared to the speed at which a transponder crosses the field of the terminal. It can be spoken of a static regulation with respect to the modulation frequencies (for example, a 13.56-MHz frequency of the remote-supply carrier and a 847.5-kHz retromodulation frequency used to transmit data from the transponder to the terminal).

As a variation of the current transformer of FIG. 4, other current measurement elements may be used (for example, a resistor).

An example of a phase regulation terminal is described in document EP-A-0857981.

Figure 5:
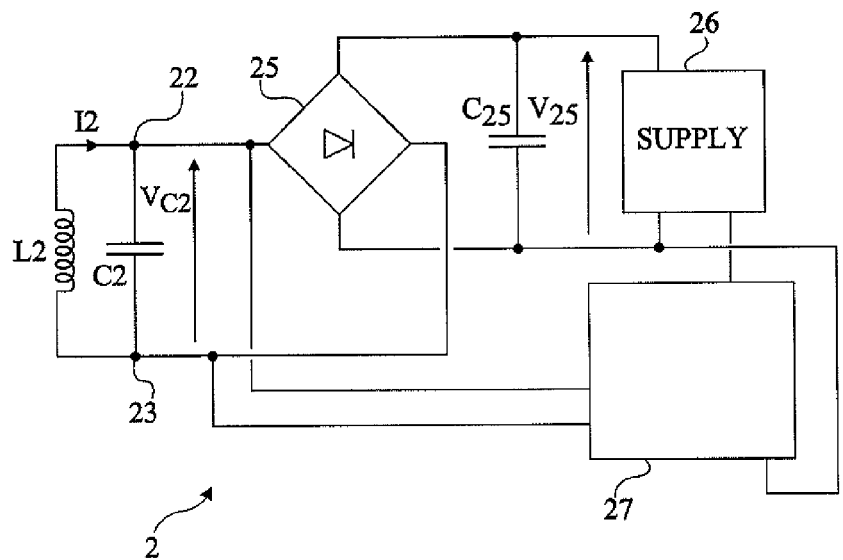
FIG. 5 is a simplified block diagram of the transponder of FIG. 3.

FIG. 5 shows an embodiment of a transponder 2. A rectifying element 25, for example, a fullwave rectifying bridge, is connected between terminals 22 and 23 of the oscillating circuit (inductance or antenna L2 and capacitive element C2 in parallel). The rectified outputs of bridge 25 are connected by a smoothing capacitive element $C_{25}$ and provide a voltage $V_{25}$ to a circuit 26 (ALIM) for managing the transponder supply. Circuit 26 provides the other transponder circuits symbolized by a block 27 with the power necessary to their operation. Elements 25, $C_{25}$, 26, and 27 are, in FIG. 3, comprised within block 21. In FIG. 5, it is considered that the transponder only operates if it is remotely supplied (no battery). Circuit 27 samples data between terminals 22 and 23 of the resonant circuit to demodulate the possible data received from the terminal before rectification. If the transponder needs to transmit data to the terminal, circuit 27 comprises so-called retromodulation capacitive and/or resistive elements capable of modulating the load formed by the transponder on the field generated by the terminal. This load modification translates, on the side of the terminal, as a modification of the current or of the voltage of its oscillating circuit (assuming that the amplifier or antenna coupler is capable of providing a constant current). This modification of the current or voltage measured by the current transformer (15, FIG. 4) or any other measurement element (for example, the measurement of the voltage across capacitive element C1) enables the terminal to decode the data received from the transponder. In a simplified version where only the transponder detection is important, the demodulation and retromodulation circuits may be omitted.

The fact for the phase to be regulated on the terminal side enables exploiting current and voltage measurements in the oscillating circuit of the terminal to deduce information relative to the coupling of the transponder (or of the simple resonant circuit in a simplified embodiment) when it is in the field of the terminal.

The data relative to the coupling reflect the variation of the distance between the two elements. This enables detection of a variation of the tire thickness, and thus an inflation or wearing problem. The distinction between an inflation problem and a wearing problem may be performed by the computer system (the terminal or the embedded computer) by taking into account the time taken by the thickness to vary.

These data take into account, in particular, the coupling between the transponder and the terminal, that is, the coupling coefficient between the oscillating circuit of terminal 1 and that of element 2. This coupling coefficient essentially depends on the distance separating the transponder from the terminal. The coupling coefficient, noted k, between the oscillating circuits of a transponder and of a terminal always ranges between 0 and 1. This coefficient may be defined by the following formula:

$$k = \frac{M}{\sqrt{L1L2}}, \qquad \text{(formula 1)}$$

where M represents the mutual inductance between inductances L1 and L2 of the oscillating circuits of the terminal and of the transponder.

The different relations linking the electric quantities measureable by the terminal in different configurations of operation with a transponder are used to periodically determine a variation of the distance between the transponder and the terminal. More specifically, a minimum distance variation between the transponder and the terminal is detected for each turn (or every n turns).

Data available on the terminal side are current I in the series oscillating circuit of the terminal. This current is linked to a so-called generator voltage (noted Vg) driving the oscillating circuit, and to apparent impedance $Z1_{app}$ of the oscillating circuit by the following relation:

$$I = \frac{Vg}{Z1_{app}}. \quad \text{(formula 2)}$$

The fact of regulating the phase of the oscillating circuit on a reference value allows for the distance variation of a transponder entering the field of a terminal to only translate as a modification of the real part of the impedance of this oscillating circuit. Indeed, all the variations which would tend to modify, statically with respect to the modulation frequencies, the imaginary part by the load formed by the transponder, are compensated for by the phase regulation loop. It is thus ensured that in static operation, the imaginary part of impedance $Z1_{app}$ is zero. Accordingly, impedance $Z1_{app}$ becomes equal to apparent resistance $R1_{app}$ and can be expressed as:

$$Z1_{app} = R1_{app} = R1 + a^2 \cdot \frac{L2}{R2 \cdot C2}, \quad \text{(formula 3)}$$

$$\text{with } a^2 = \frac{k^2 \cdot \omega^2 \cdot L1 \cdot L2}{X2^2 + \left(\frac{L2}{R2 \cdot C2}\right)^2}, \quad \text{(formula 4)}$$

where ω represents the signal pulse, X2 represents the imaginary part of the impedance of the oscillating circuit of the transponder ($X2=\omega L2-1/\omega C2$), and R2 represents the load formed by the transponder elements on its own oscillating circuit (elements of circuit 21 modeled by resistor R2 in parallel on inductance L2 and capacitor C2). In other words, resistor R2 represents the equivalent resistance of all the transponder circuits (microprocessor, retromodulation means, etc.), brought in parallel on capacitor C2 and inductance L2. In the above formula 3, the series resistance of inductance L1, which adds to the other two terms, has been neglected. It can also be considered that the value of this series resistance is, by simplification, included in the value of resistance R1.

By combining formulas 2, 3, and 4, current I can be expressed as follows:

$$I = \frac{Vg}{R1 + k^2 \cdot \frac{\omega^2 \cdot L1 \cdot L2^2}{Z2^2 \cdot R2 \cdot C2}}, \quad \text{(formula 5)}$$

with:

$$Z2^2 = X2^2 + \left(\frac{L2}{R2 \cdot C2}\right)^2, \quad \text{(formula 6)}$$

with Z2 representing the impedance of the transponder.
Further, on the transponder side, one can write:

$$Z2 \cdot I2 = M \cdot \omega \cdot I = k \cdot \sqrt{L1 \cdot L2} \cdot \omega \cdot I, \quad \text{(formula 7)}$$

where I2 represents the current in the oscillating circuit of the transponder. Thereby:

$$I2 = \frac{k \cdot \sqrt{L1 \cdot L2} \cdot \omega \cdot I}{Z2}. \quad \text{(formula 8)}$$

Formula 8 combined with formulas 4 and 6 can be reduced to the following expression:

$$I2 = a \cdot I. \quad \text{(formula 9)}$$

Voltage $V_{C2}$ recovered across capacitor C2 of the transponder is given by the following relation:

$$V_{C2} = \frac{I2}{\omega \cdot C2} = \frac{a \cdot I}{\omega \cdot C2}. \quad \text{(formula 10)}$$

As a first approximation, the following can be written by combining formulas 5 and 6 in which imaginary part X2 of impedance Z2 is close to 0 at the first order (the circuit is tuned):

$$I = \frac{Vg}{R1 + k^2 \cdot \frac{L1}{L2} \cdot R2}, \quad \text{(formula 11)}$$

and recovered voltage $V_{C2}$ can be calculated in the same conditions by the following formula:

$$V_{C2} = k \cdot \sqrt{\frac{L1}{L2}} \cdot \frac{Vg}{\frac{R1}{R2} + k^2 \cdot \frac{L1}{L2}}. \quad \text{(formula 12)}$$

Among the electric quantity measurements which can easily be performed on the terminal side, it is provided to use values off-load and in a reference coupling position.

The off-load value represents the current and the voltage when no transponder is present in the field of the terminal. In this off-load operation, the apparent impedance, called $Z1_{off\text{-}load}$, of the oscillating circuit of the terminal now only depends on its components R1, L1, and C1. Further, due to the phase regulation, the imaginary part of this impedance is always zero. One can thus write:

$$I_{off\text{-}load} = \frac{Vg}{R1}. \quad \text{(formula 13)}$$

The reference coupling, noted $k_{ref}$, is established for a given distance between the transponder and the terminal. This reference condition corresponds, for example, to a calibration or an initialization of the system in a given situation, for example, when the tire is new and ideally inflated. This condition corresponds to a reference coupling at a minimum distance between the transponder and the terminal.

In the position considered as the reference coupling position (ideally-inflated tire), a measurement of current $I_{ref}$ in the oscillating circuit of the terminal may be taken and stored by the terminal.

In an embodiment, resistance R1 of the oscillating circuit is fixed. In this case, a variation of the coupling with respect to the ratio between the off-load value and the value at the reference coupling recorded in an initialization is detected.

The reference coupling value is arbitrary and may be different from one tire to another. This embodiment is more specifically intended for the case where element 2 is a simple resonant circuit (of fixed impedance).

In another embodiment, series resistance R1 of the oscillating circuit of the terminal is capable of optimizing the coupling in normal conditions (properly-inflated tire). This functionality is illustrated in FIG. 4 by a block 30 (CONTROLLABLE R1). Such an embodiment enables, for example, to ease the adaptation of the terminal to different transponders, and thus to different tires. This leaves more flexibility in the respective structures of the transponders in terms of the load that they form on the oscillating circuit of the terminal. Resistor R1 is then used to electrically set the terminal to place the coupling system in a so-called optimum coupling position. This position corresponds to that with the most power transfers from the terminal to the transponder. Such an embodiment also enables, in the case of a transponder having to exchange data with the terminal, to optimize the power transfer from the terminal to the transponder.

The optimum coupling is defined as being the position at which voltage $V_{C2}$ recovered across the transponder is maximum. This optimum coupling, noted $k_{opt}$, can be expressed as:

$$k_{opt} = \sqrt{\frac{L2 \cdot R1}{L1 \cdot R2}} \quad \text{(formula 14)}$$

Reference voltage $V_{C2opt}$ at the optimum coupling is given by following formula:

$$V_{C2opt} = \sqrt{\frac{R2}{R1}} \cdot \frac{V_g}{2}. \quad \text{(formula 15)}$$

Formulas 12 and 13 of current I and of recovered voltage $V_{C2}$ can be rewritten according to the coupling normalized by the optimum coupling ($k/k_{opt}$). Always assuming that imaginary part X2 of impedance Z2 is close to 0, the following is obtained:

$$V_{C2} = 2 \cdot V_{C2opt} \cdot \frac{\frac{k}{k_{opt}}}{1 + \left(\frac{k}{k_{opt}}\right)^2}, \quad \text{(formula 16)}$$

$$\text{and } I = \frac{I_{off-load}}{1 + \left(\frac{k}{k_{opt}}\right)^2}. \quad \text{(formula 17)}$$

One can thus write:

$$\left(\frac{k}{k_{opt}}\right)^2 = \frac{I_{off-load}}{I} - 1. \quad \text{(formula 18)}$$

Further, the value of voltage $V_{R1}$ across resistor R1 of the terminal is given by:

$$V_{R1} = \frac{V_g}{1 + \left(\frac{k}{k_{opt}}\right)^2}. \quad \text{(formula 19)}$$

At the optimum coupling, that is, when $k=k_{opt}$:

$$I_{opt} = \frac{I_{off-load}}{2} = \frac{V_g}{2 \cdot R1}, \text{ and } V_{R1\,(opt)} = \frac{V_g}{2}.$$

The voltage across the oscillating circuit of the terminal is given by:

$$V_{R1} = \frac{V_g}{1 + \left(\frac{k}{k_{opt}}\right)^2}$$

and also reaches value $V_g/2$ in the optimum coupling position.

The data relative to the optimum and reference couplings may be used, in a training phase, to deduce the position of optimum coupling point $k_{opt}$ of the transponder with respect to the current position. The ratio between these two coupling coefficients is a function of the currents off-load ($I_{off-load}$) and at the reference coupling ($I_{ref}$).

Figure 6:
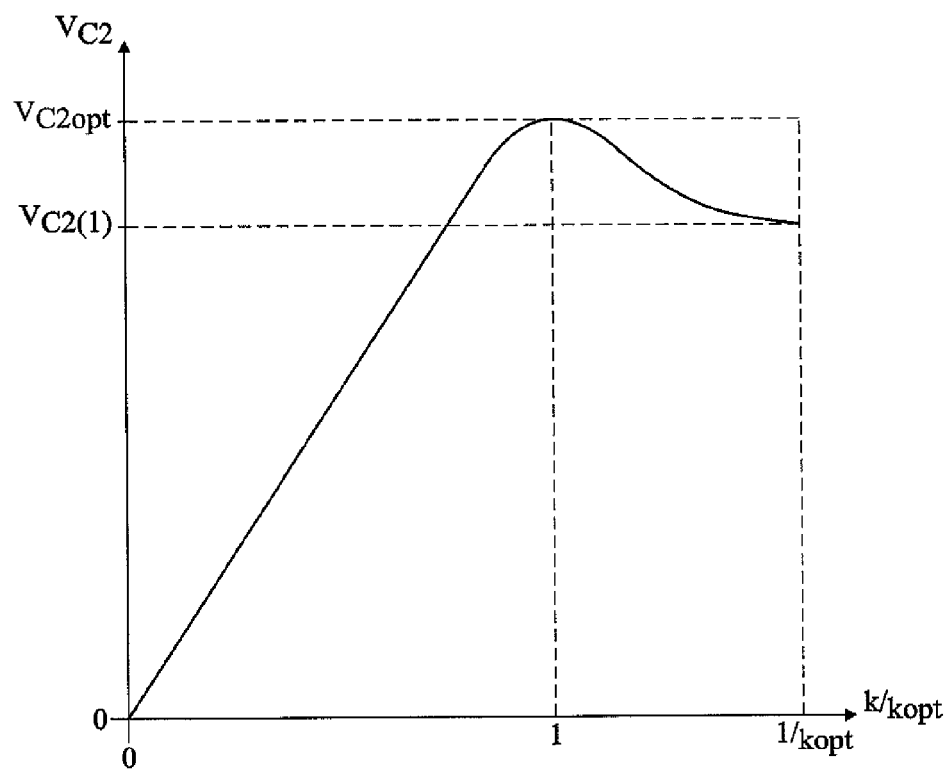
FIG. 6 illustrates the variation of the voltage across the resonant circuit of the transponder according to a standardized coupling.

FIG. 6 shows an example of the shape of voltage $V_{C2}$ recovered on the transponder side according to normalized coupling $k/k_{opt}$.

The curve starts from the origin of the ordinates (zero voltage) for a null coupling. This corresponds to a distance between the transponder and the terminal such that no signal is received by the transponder. Voltage $V_{C2}$ reaches a maximum $V_{C2opt}$ for an optimum coupling coefficient $k_{opt}$ ($k/k_{opt}=1$), then decreases to an intermediary value $V_{C2}(1)$ reached at coupling 1.

The position which corresponds to a null coupling corresponds to an off-load position of the terminal, and thus to the off-load current ($I_{off-load}$). In this position, voltage $V_{R1}$ is equal to off-load value $V_g$.

In the optimum coupling position ($k=k_{opt}$), current $I_{opt}=I_{off-load}/2$ and voltage $V_{R1opt}=V_g/2$.

In a coupling position k equal to 1, current I corresponds to $$\frac{I_{off-load}}{1 + \left(\frac{1}{k_{opt}}\right)^2}$$

and voltage $V_{R1}$ is equal to $$\frac{V_g}{1 + \left(\frac{1}{k_{opt}}\right)^2}.$$

This position is a theoretic position since a coupling coefficient k=1 is in reality never achieved.

In the reference position, the following can be written:

$$I_{k_{ref}} = \frac{I_{off\text{-}load}}{1 + \left(\frac{k_{ref}}{k_{opt}}\right)^2}, \text{ and} \quad \text{(formula 20)}$$

$$V_{R1_{k_{ref}}} = \frac{Vg}{1 + \left(\frac{k_{ref}}{k_{opt}}\right)^2}. \quad \text{(formula 21)}$$

Thus, the measurement of current $I_{ref}$ or of voltage $V_{R1kref}$ in a training phase is sufficient to determine reference coupling $k_{ref}$ with respect to optimum coupling $k_{opt}$. This enables to adapt the value of resistance R1 so that the reference coupling corresponds to the optimum coupling or at least comes close to it.

A situation where $I_{ref}$ is smaller than $I_{off\text{-}load}/2$ (where $V_{R1ref}$ is smaller than $Vg/2$) corresponds to a position where the coupling is greater than the optimum coupling.

A situation where $I_{ref}$ is greater than $I_{off\text{-}load}/2$ (where $V_{R1ref}$ is greater than $Vg/2$) corresponds to a position where the coupling is smaller than the optimum coupling.

In the two above cases, the transponder cannot in principle benefit from the possible voltage maximum $V_{C2opt}$ since value $V_{C2ref}$ is smaller than value $V_{C2opt}$.

It is then provided to modify the value of the series resistance (R1) of the terminal so that the reference coupling point corresponds to the optimum coupling to thus benefit from the maximum recoverable voltage $V_{C2opt}$.

For this purpose, at the reference coupling, for example when the tire is cold and properly inflated and the wheel is in a position where the distance between the transponder and the terminal is minimum, the value of current I is measured, that is, $I_{ref0}$ with an initial value, noted $R1_0$, of resistance R1. Since the terminal will previously have measured and stored off-load value $I_{off\text{-}load}$, it can be determined whether the value of resistance R1 must be modified.

If ratio $I_{off\text{-}load}/I_{ref0}$ is greater than 2 ($k_{ref}/k_{opt0}>1$), where $k_{opt0}$ designates the optimum coupling with value $R1_0$, the optimum coupling of the terminal-transponder system corresponds to a position more distant from the terminal than when the transponder is laid on it and this, with resistance $R1_0$.

If ratio $I_{off\text{-}load}/I_{ref0}$ is smaller than 2 ($k_{ref}/k_{opt0}<1$), optimum coupling $k_{opt}$ corresponds to a theoretical value never physically obtained with the value of resistance $R1_0$.

In both cases, it however remains possible to modify the value of resistance R1 so that its new value, noted $R1_1$, has the optimum coupling of the system $k_{opt}$ coincide with the value of reference coupling $k_{ref}$, to benefit from the maximum voltage $V_{C2opt}$ recoverable for the transponder. Thus, the value of the initial optimum coupling of the system is adapted by modifying the value of series resistance R1 so that it corresponds to the reference coupling of the transponder, that is, in the minimum distance position for a properly-inflated tire. This amounts to passing from value $R1_0$ to a value $R1_1$ such that the value of current I reaches $I_{off\text{-}load}/2$, that is, corresponds to the critical optimum coupling.

Formula 20 enables writing:

for value $R1_0$:

$$\left(\frac{k_{ref}}{k_{opt0}}\right)^2 = \frac{I_{off\text{-}load}}{I_{ref0}} - 1, \text{ with } k_{opt0} = \sqrt{\frac{L2}{R2} \cdot \frac{R1_0}{L1}},$$

and for value $R1_1$:

$$\left(\frac{k_{ref}}{k_{opt1}}\right)^2 = \frac{I_{off\text{-}load}}{I_{ref1}} - 1 = 1$$

(since by definition $R1_1$ enables to achieve the maximum coupling, which amounts to saying that $I_{off\text{-}load}/I_{ref1}=2$), with $$k_{opt1} = \sqrt{\frac{L2}{R2} \cdot \frac{R1_1}{L1}},$$

where $I_{ref1}$ and $k_{opt1}$ respectively designate reference current $I_{ref}$ and optimum coupling $k_{opt}$ for value $R1_1$ of resistance R1.

The above equation system leads to:

$$\left(\frac{k}{k_{opt1}}\right)^2 = \frac{R1_0}{R1_1} \cdot \left(\frac{k}{k_{opt0}}\right)^2, \quad \text{(formula 22)}$$

and:

$$R1_1 = R1_0 \cdot \left(\frac{I_{off\text{-}load}}{I_{ref0}} - 1\right). \quad \text{(formula 23)}$$

The value of resistance R1 is thus set either by being decreased when value $k_{ref}$ is smaller than value $k_{opt}$, either by being increased when the value of $k_{ref}$ is greater than value $k_{opt}$, so that, in the reference position, the value of current I reaches $I_{off\text{-}load}/2$, that is, corresponds to the critical optimum coupling. The value of resistance R1 may also be set to reach the optimum coupling based on measurements of voltage $V_{R1}$ across resistor R1. In this case, the value of resistance R1 is set so that voltage $V_{R1}$ (or voltage $V_{L1C1}$) across the oscillating circuit reaches value $Vg/2$ at the optimum coupling.

Figure 7:
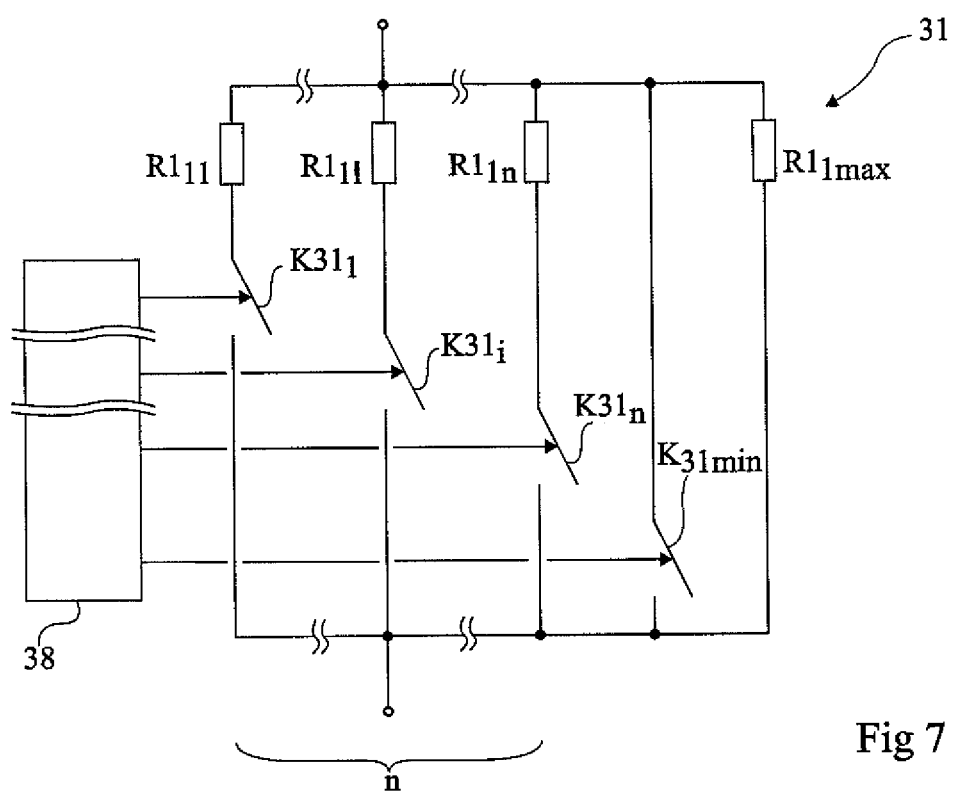
FIG. 7 is a partial diagram of an embodiment of an adaptation circuit on the terminal side.

FIG. 7 shows an example of a circuit of switchable resistors usable to implement the resistive selection (resistor 31) to initialize the system at the optimum coupling. In this example, a resistor $R1_{1ref}$ is in parallel with a switch $K_{31min}$ as well as with n branches of resistors $R1_{1i}$ (with i ranging between 1 and n) in parallel. Each resistor $R1_{1i}$ is in series with a controllable switch $K_{31i}$. These switches are controlled by circuit 38 according to the performed measurements. Switch $K_{31min}$ in on position makes resistance R1 equal to resistance 32. When all switches $K_{31i}$ are off, the resistance of element 31 is $R1_{ref}$. The other positions provide intermediary values.

Figure 8:
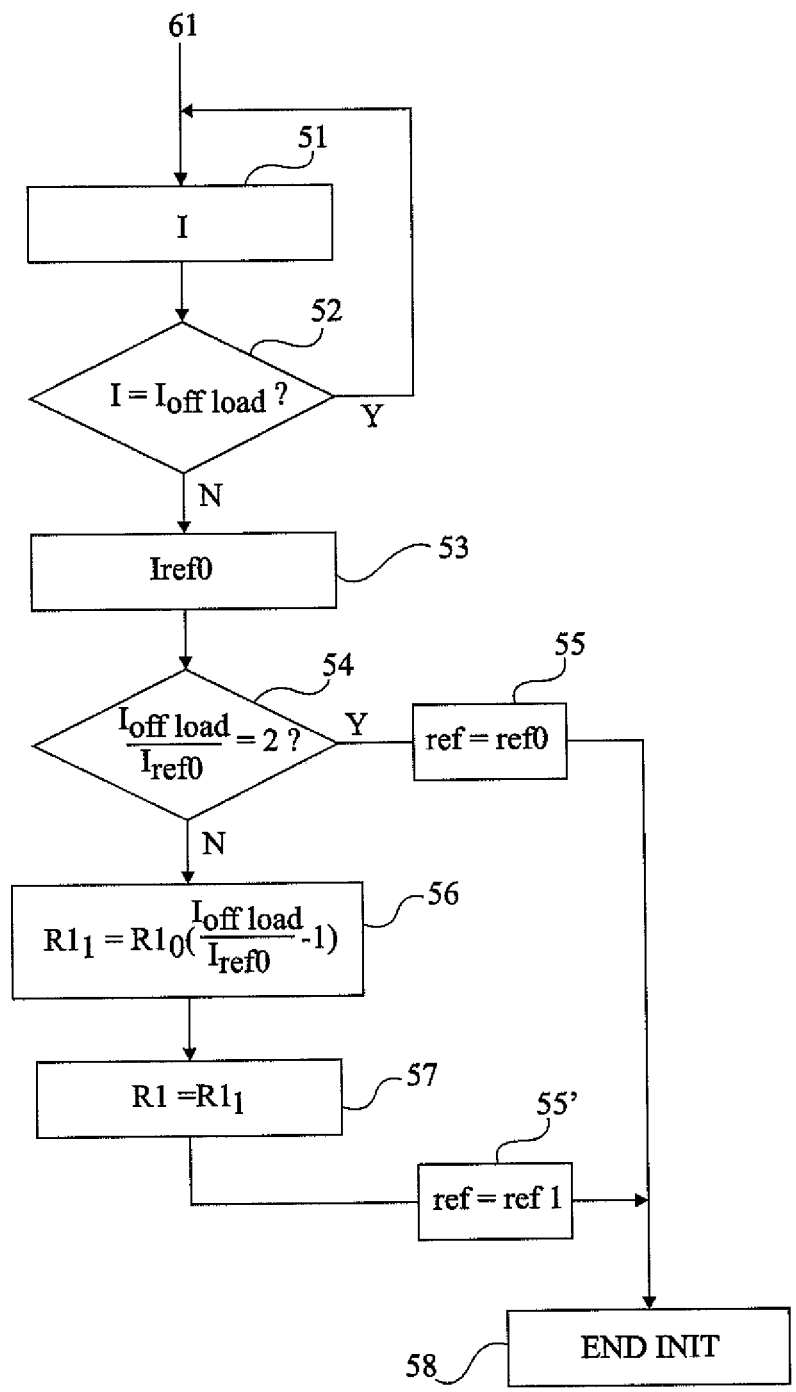
FIG. 8 is a flowchart illustrating an embodiment of an initialization phase of the terminal.

FIG. 8 is a flowchart of an embodiment of the resistance selection method. This flowchart illustrates the case of an exploitation of a measurement of the current but easily transposes to an exploitation of a measurement of the voltage across resistor R1. It always is data representative of the current in the oscillating circuit of the terminal.

The terminal is assumed to have previously been initialized in the off-load state and value $I_{off\text{-}load}$ (or any corresponding data) is assumed to have been stored. Such an initialization may be performed on manufacturing, but will preferably be performed on-site, each time a tire is being positioned, to take into account possible disturbances linked to the terminal's environment.

It is started by measuring (block 51, I) the value of the current in the oscillating circuit. This value is compared (block 52, $I=I_{off\text{-}load}$?) with the off-load value. In case of an equality (output Y of block 52), this means that no transponder is in the field and it is returned to the entry of block 51. Otherwise (output N of block 52), reference current $I_{ref0}$ is measured with resistance value $R1_0$ (block 53, $I_{ref0}$), considering that the transponder is at a minimum distance (in the reference position). Then, the ratio between the off-load current and the current with resistance $R1_0$ is compared with constant 2 (block 54, $I_{off-load}/I_{ref0}=2$?). This amounts to comparing the measured current with a value ($I_{off-load}/2$) which is a function of the off-load current. In case of an equality (output Y of block 54), resistance R1 is not modified and the reference is validated with resistance $R1_0$ and the corresponding current or its ratio with the off-load current is stored (block 55, ref=ref0). Otherwise (output N of block 54), a resistance value $R1_1$ is calculated from value $R1_0$ and the previously-established ratio (block 56, $R1_1=R1_0((I_{off-load}/I_{ref0})-1)$ and the closest value is selected from network 31. As a variation, a variable resistor is adapted. In other words, the value to be given to resistance R1 is selected according to the first value ($R1_0$), to the measured data ($I_{ref0}$), and to the constant ($I_{off-load}/2$). Then (block 57, $R1=R1_1$), the resistance value of the oscillating circuit is set (for example, by means of network 31 of FIG. 7) to be as close as possible to the calculated value $R1_1$. Then, the reference is validated with value $R1_1$ (block 55', ref=ref1) and the corresponding value of the current and/or of its ratio with the off-load current is stored. At the exit of blocks 55 and 55', the initialization is over (block 58, END INIT).

Figure 9:
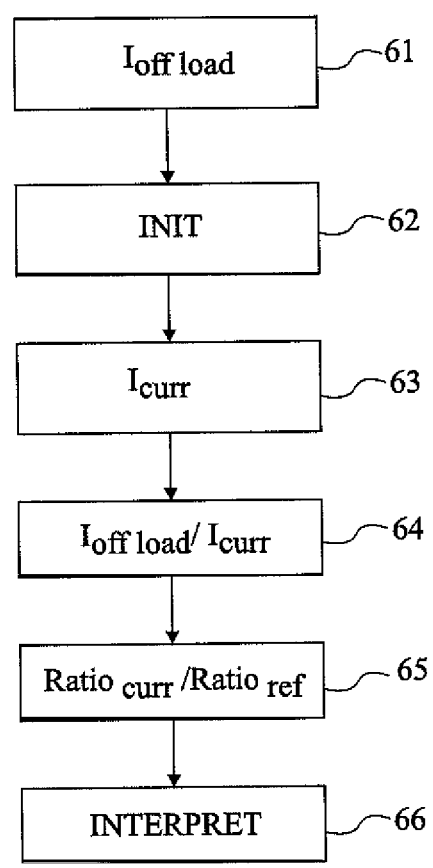
FIG. 9 is a flowchart illustrating an embodiment of the method for detecting the pressure defect.

FIG. 9 is a simplified flowchart of an embodiment of the method for detecting a mis-inflation.

In a training phase, a measurement of the off-load current is made and stored before assembling the tire (block 61, $I_{off-load}$). For example, the assembler validates a control signal from the embedded computer or from the terminal indicating a need to record the measurement and to consider it as an off-load measurement.

Then, the wheel is assembled with a tire in an inflation situation considered as optimal and in the reference position (element 2 closest to the terminal). This reference position is for example indicated by a mark on the tire (if said tire is pre-equipped with element 2) or determined by the assembler on assembly.

Then starts an initialization phase (block 62, INIT) which corresponds to the recording of the reference values. With a terminal having an adjustable resistance R1, this phase for example corresponds to steps 51 to 58 of FIG. 8. With a simplified terminal, this phase comprises recording the reference current or the value of the ratio of the off-load current to this reference current.

The system is then ready to operate. The measurement of current I (block 63, $I_{curr}$) in the oscillating circuit of the terminal is preferably permanent (to within the sampling for digital values) and the terminal or the embedded computer determines the maximum at each turn of the wheel. For this purpose, the system only takes into account the peak values of current I.

The system calculates ratio $Ratio_{curr}=I_{off-load}/I_{curr}$ (block 64).

Each ratio $Ratio_{curr}$ is compared at any time or periodically with a ratio $Ratio_{ref}=I_{off-load}/I_{ref}$ stored with the reference value (block 65).

The interpretation (block 66, INTERPRET) is the following:

if ratio $Ratio_{curr}$ is smaller than reference ratio $Ratio_{ref}$, this means that the tire has drawn away from the terminal, and thus a pressure drop or a wearing. According to the rapidity of the decrease of ratio $Ratio_{curr}$, it is possible to discriminate a pressure drop (even slow) from a wearing which has a slower variation. The threshold between a wearing and a pressure drop is determined by calibration of the system, preferably on design thereof.

if ratio $Ratio_{curr}$ is greater than reference ratio $Ratio_{ref}$, this means, on the contrary, that the pressure in the tire increases. It is then possible, by setting a threshold, to detect a possible overheating.

In the case where the reference has been adapted to correspond to the optimum coupling, the comparison can be reduced to comparing current ratio $Ratio_{curr}$ to 2.

It is now possible to detect a pressure fault (over- or under-pressure) and/or a wearing without any pressure sensor or rubber thickness measurement.

It is also possible to implement such a system with simplified elements 2, requiring no communication with the terminal.

However, the system is compatible with more advanced versions of elements 2, of transponder type.

Different embodiments have been described. Different variations may be envisaged. In particular, the practical implementation of the described embodiments is within the abilities of those skilled in the art based on the functional indications given hereabove, by using the tools generally available in the terminal (programmable logic, detectors, microprocessor, etc.). For example, the granularity of the setting of resistance R1 depends on the structure of the terminal. Further, the terminals and transponders will of course preferably, when designed and manufactured, be sized according to distance ranges approximately common between the terminals placed in the vehicles and the tire treads. The impedances of the resonant circuits of elements 2 may be set on manufacturing according to the tire types so that the reference value is as stable as possible with a given vehicle and is different from one vehicle/tire association to another. Further, although a determination of the reference value with a fixed position of the tire is preferred, it can be envisaged to determine this reference over a short distance traveled by the vehicle with a properly-inflated tire by taking the peak value of the current then measured.

A method and a system for detecting a variation in the inflation or the thickness of a tire of a wheel assembled on an axle have been described hereabove. It should be noted that, generally, the described method and system may be used for any determination of the distance variation with respect to an axis of a point of an object rotating around this axis (the length variation of a radius in the case of a circular object).

The diameter variation of a wheel of a machine tool may also be determined, a diameter increase for example reflecting an excessive heating. In the case of a merry-go-round or carrousel, the distance with respect to an axis of an object attached on the merry-go-round or carrousel may be detected. By providing on a same rotating object several transponders identifiable by personalized signatures, irregular deformations may be detected, for example, an out-of-roundness of the rotating circular object.

The length variation of an element rotating around an axis, for example, the arm of a weightlessness simulation centrifuge or the end of a helix blade, may also be determined.

It should be noted that a system implementing the described method may, provided to add appropriate signal processing means, further be used to provide an indication of the speed and/or the stopping and/or the starting of a rotating object, such as for example a dishwasher sprinkler, a possible blocking of which can thus be detected. It may also be used to determine a stopping position, for example, in the case of a merry-go-round for which one or several successive stopping positions are desired to be set.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of detection of a distance variation between an object rotating around an axis and a terminal fixed in position with respect to the axis and capable of emitting a radio-frequency field for at least one resonant circuit attached to the object, comprising:
measuring and recording, on the terminal side, a maximum value of a quantity representative of the coupling between an oscillating circuit of the terminal and said at least one resonant circuit; and
detecting a variation, over multiple rotations of the rotating object, of the maximum value, wherein the detected variation in the maximum value is representative of a distance variation over time with respect to the axis.

2. The method of claim 1, wherein said at least one resonant circuit is an element of a transponder capable of transmitting a signature to the terminal.

3. The method of claim 1, wherein a reference value of said quantity is measured and recorded, on the terminal side, in an initial condition of the object.

4. The method of claim 3, wherein an off-load value of said quantity is measured and recorded, on the terminal side, in the absence of the object, said detection being performed based on the variation of the quotient of this off-load value to the measured value with respect to the quotient of this off-load value to the reference value.

5. The method of claim 4, wherein a series resistance of the oscillating circuit of the terminal is adjusted so that the reference value corresponds to an optimum coupling position between the terminal and the resonant circuit.

6. The method of claim 5, wherein the value of the series resistance is selected so that the ratio between the off-load value and the reference value is approximately equal to 2.

7. The method of claim 1, wherein said quantity is data relative to the current in the oscillating circuit or to the voltage thereacross.

8. The method of claim 1, wherein the object is a tire of a wheel assembled on an axle and the resonant circuit is attached to the tire in a fixed position with respect to its tread.

9. A system of detection of a distance variation of an object rotating about an axis with respect to the axis, comprising:
a terminal in a fixed position with respect to the axis and capable of emitting a radio frequency field; and
at least one resonant circuit attached to the object, wherein the terminal is configured to implement the method of claim 1.

10. The system of claim 9, further comprising means for detecting the stopping or the starting of the rotating object.

11. The system of claim 10, further comprising means for detecting the stopping position of the rotating object.

12. The system of claim 10, further comprising means for measuring the speed of the rotating object.

13. A method for detecting a distance variation between an object rotating about an axis of rotation and a terminal fixed in position with respect to the axis of rotation, comprising:
transmitting, by the terminal, a radio frequency field toward the rotating object; and
measuring, by the terminal, a variation, over multiple rotations of the rotating object, of a maximum coupling between an oscillating circuit of the terminal and a resonant circuit affixed to the rotating object, wherein the variation of the maximum coupling is indicative of a distance variation over time between the rotating object and the axis.

14. A method as defined in claim 13, wherein the resonant circuit comprises an electronic tag.

15. A method as defined in claim 13, wherein the resonant circuit comprises an electromagnetic transponder.

16. A method as defined in claim 13, further comprising measuring a reference coupling between the oscillating circuit and the resonant circuit and comparing the measured maximum coupling with the reference coupling to thereby determine the distance variation.

17. A method as defined in claim 13, further comprising adjusting the oscillating circuit for a maximum value of coupling between the oscillating circuit and the resonant circuit.

18. A method as defined in claim 13, wherein the rotating object is a tire of a vehicle.

19. A method as defined in claim 18, wherein transmitting the radio frequency field comprises directing the radio frequency field at a tread of the tire.

20. A method as defined in claim 18, wherein transmitting the radio frequency field comprises directing the radio frequency field along a radial direction with respect to the axis of rotation of the tire.

21. A method as defined in claim 18, wherein the measured distance variation is representative of an inflation level of the tire.

22. A method as defined in claim 18, wherein the measured distance variation is representative of tread wear of the tire.

23. A method as defined in claim 13, wherein measuring comprises measuring a current or a voltage of the oscillating circuit.

24. A method as defined in claim 23, further comprising measuring a reference value of the current or the voltage of the oscillating circuit in an initial condition of the rotating object.

25. A method as defined in claim 24, further comprising comparing the measured current or voltage to the reference value to determine the distance variation.

26. A system to detect a distance variation between an object rotating about an axis of rotation and the axis of rotation, comprising:
a terminal mounted in a fixed position with respect to the axis of rotation, the terminal including an oscillating circuit configured to transmit a radio frequency field toward the rotating object; and
a resonant circuit affixed to the rotating object, wherein the terminal is configured to measure a variation, over multiple rotations of the rotating object, of a maximum coupling between the oscillating circuit and the resonant circuit and wherein the variation of the maximum coupling is indicative of the distance variation over time between the rotating object and the axis.

27. A system as defined in claim 26, wherein the resonant circuit comprises an electronic tag or an electromagnetic transponder.

28. A system as defined in claim 26, wherein the terminal is configured to measure a reference coupling between the oscillating circuit and the resonant circuit and to compare the measured maximum coupling with the reference coupling to thereby determine the distance variation between the rotating object and the axis.

29. A system as defined in claim 26, wherein the terminal is further configured to adjust the oscillating circuit for a maximum value of coupling between the oscillating circuit and the resonant circuit.

30. A system as defined in claim 26, wherein the resonant circuit is affixed to a tire of a vehicle.

31. A system as defined in claim 30, wherein the terminal is configured to transmit a radio frequency field along a radial direction with respect to the axis of rotation of the tire.

* * * * *